United States Patent [19]

Thompson

[11] 4,202,680
[45] May 13, 1980

[54] FLUID FLOW APPARATUS IN COMBINATION WITH GLASS FIBER FORMING APPARATUS

[75] Inventor: Thomas K. Thompson, Granville, Ohio

[73] Assignee: Owens-Corning Fiberglas Corporation, Toledo, Ohio

[21] Appl. No.: 951,542

[22] Filed: Oct. 16, 1978

[51] Int. Cl.² ............................................. C03B 37/02
[52] U.S. Cl. ...................................... 65/12; 65/11 W; 239/590.5
[58] Field of Search ................... 65/1, 2, 11 W, 11 R, 65/12; 239/590.5

[56] References Cited

U.S. PATENT DOCUMENTS

| | | | |
|---|---|---|---|
| 3,905,790 | 9/1975 | Strickland | 65/2 |
| 3,979,195 | 9/1976 | Strickland | 65/1 |
| 3,982,915 | 9/1976 | Coggin | 65/1 |
| 3,986,853 | 10/1976 | Coggin et al. | 65/2 |
| 3,988,135 | 10/1976 | Coggin | 65/1 |
| 4,003,731 | 1/1977 | Thompson | 65/12 |
| 4,033,742 | 7/1977 | Nichols et al. | 65/2 |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

The present invention comprises fluid flow nozzle apparatus comprising a chamber having an inlet, a first outlet means opening from said chamber for discharging fluid from said chamber, a first duct means abutting said chamber in open communication with said chamber and surrounding said first outlet means, a second outlet means opening from said chamber for discharging fluid from said chamber, a second duct means abutting said chamber in open communication with said chamber and surrounding said second outlet means, and a third outlet means opening from said chamber and adapted for discharging fluid from said chamber between said first duct means and said second duct means.

19 Claims, 9 Drawing Figures

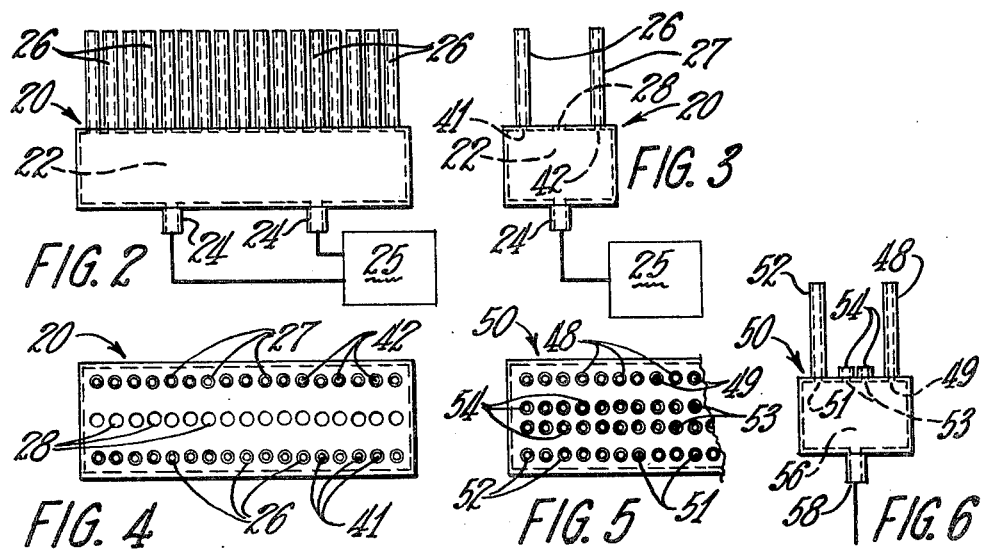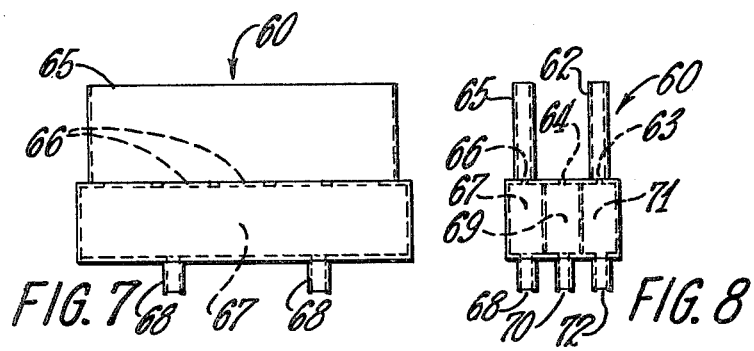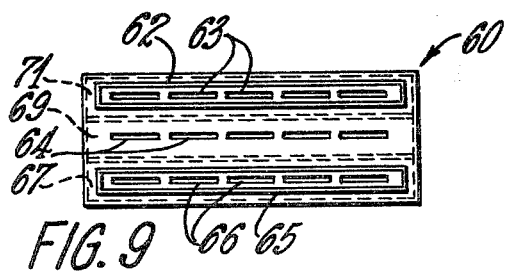

FLUID FLOW APPARATUS IN COMBINATION WITH GLASS FIBER FORMING APPARATUS

This invention relates to an apparatus for fluid flow. More specifically, this invention relates to a nozzle apparatus for introducing a fluid to a fiber forming bushing from which streams of glass are drawn. The fluid is introduced to control the fiber forming environment.

Developments in the production of glass fibers have led to the utilization of streams of fluid, such as air and other gases, herein after referred to as air, directed upwardly to a fiber forming bushing. The upwardly moving air control the fiber forming environment. Such streams of air maintain separation of the streams of glass and prevent flooding of the bushing. Also, the cooling effect of the air serves to rapidly quench the glass streams as glass fibers or filaments are attenuated from the bushing.

It has been found that a generally uniform flow of air at the glass cone region of the bushing is desired. Thus, apparatus for delivering or creating such a uniform flow of air at the glass cone region of the bushing is important and improvements in such apparatus are desired.

The present invention comprises fluid flow nozzle apparatus comprising a chamber having an inlet, a first outlet means opening from said chamber for discharging fluid from said chamber, a first duct means abutting said chamber in open communication with said chamber and surrounding said first outlet means, a second outlet means opening from said chamber for discharging fluid from said chamber, a second duct means abutting said chamber in open communication with said chamber and surrounding said second outlet means, and a third outlet means opening from said chamber and adapted for discharging fluid from said chamber between said first duct means and said second means.

An object of the invention is to provide an improved apparatus for fluid flow.

Another object of the invention is to provide an improved fluid flow apparatus for use in a glass forming operation.

These and other objects will become apparent when the following specification is considered along with the accompanying drawings in which:

FIG. 2 is a side view of one embodiment of the fluid flow apparatus shown in FIG. 1 according to the principles of the invention;

FIG. 3 is an end view of the fluid flow apparatus of FIG. 2;

FIG. 4 is a top view of the fluid flow apparatus of FIG. 2;

FIG. 5 is a top view of another embodiment of the fluid flow apparatus according to the principles of the invention;

FIG. 6 is an end view of the fluid flow apparatus of FIG. 5;

FIG. 7 is a side view of another embodiment of the fluid flow apparatus according to the principles of the invention;

FIG. 8 is an end view of the fluid flow apparatus of FIG. 7;

FIG. 9 is a top view of the fluid flow apparatus of FIG. 7.

Figure 1:
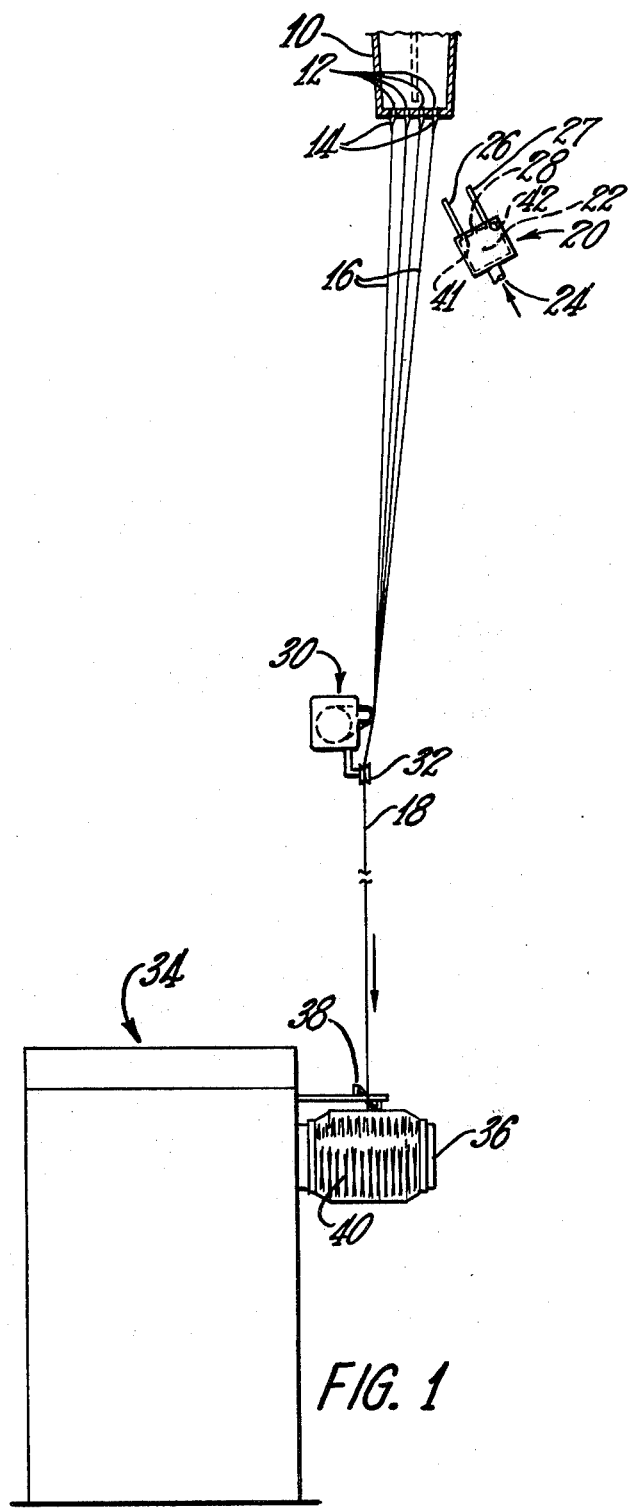
FIG. 1 is a front elevational view of a glass fiber forming operation in accordance with the invention.

With reference to the drawings, FIG. 1 shows bushing 10 connected to a forehearth (not shown) of a furnace for melting glass or glass-forming materials. The bushing is provided with a plurality of orifices 12 from which cones 14 of molten glass material are produced for the attenuation of glass filaments 16 for collection on winder apparatus 34. The filaments are passed over sizing applicator 30 and also over gathering pulley 32 which gathers the filaments into strand 18 for winding into package 40 on the winder apparatus.

Winder 34 has a winding collet 36 mounted for rotation about a horizontal axis for the collection of strand into packages. A collection tube (not shown) is placed over the collet for collection of the wound package thereon. A variable speed drive (not shown) within the housing of the winder rotates the collet. Conventional winder speed controls (not shown) modify the rotational speed of the collet during formation of packages.

Strand traversing apparatus 38, such as a spiral wire traverse, is provided for distributing the strand along the length of the collet during strand collection.

Bushing 10 in FIG. 1 is shown as a tipless bushing. However, the bushing can have a plurality of orificed projections, or tips, depending from the bushing floor through which the molten glass is supplied for attenuation into fibers.

The glass fiber forming process shown in FIG. 1 is provided with a fluid flow nozzle apparatus for controlling the fiber forming environment.

As shown, nozzle 20 comprises chamber 22 having a fluid inlet means 24 opening into the chamber. The nozzle also comprises first, second and third outlet means 41, 42, and 28 respectively, and first and second duct means 26 and 27 respectively.

FIGS. 2, 3 and 4 show the nozzle apparatus of FIG. 1 in greater detail.

Air, is supplied from supply means 25 to fluid inlet means 24 into chamber 22. The fluid is discharged from the chamber through the three outlet means. First outlet means 41 comprises a plurality of orifices opening from the chamber. As shown, the apertures are circular in shape. The second outlet means comprises a plurality of apertures opening from the chamber. These apertures are also shown to be circular in shape. The third outlet means also comprises a plurality of apertures which are circular in shape. The first, second and third plurality of apertures are each arranged in rows extending longitudinally along said chamber and the rows of circular apertures can be in parallel relationship.

First duct means 26 abuts the chamber in open communication with the chamber and surrounds the first outlet means. As shown, the first duct means comprises a plurality of tubes with each tube surrounding an individual aperture of the first outlet means. Likewise, second duct means 27 abuts the chamber in open communication with the chamber and surrounds the second outlet means. This second duct means is also shown to be a plurality of tubes wherein each aperture of the second outlet means is surrounded by an individual tube. Third outlet means 28 is located between the other two outlet means and the third outlet means is adapted for discharging fluid from said chamber between the first and second duct means.

This nozzle had been found to provide uniform cooling in the fiber forming region of a glass fiber forming bushing. As can be seen, the fluid discharge ends of the first and second duct means are spaced from the chamber. The fluid being discharged from the third outlet means is discharged generally adjacent the chamber, and is discharged between the first and second duct means. With this arrangement, it has been found that a large glass fiber forming environment region can be satisfactorily controlled. It has been found to be important that the fluid from the third discharge means be discharged between the first and second duct means rather than at or beyond the discharge ends of the first and second duct means.

The nozzle has a chamber having an inlet, a first opening means adapted for discharge from the chamber at a first locus, a second opening means adapted for discharge from said chamber at a second locus, and a third opening means located between the first and second opening means and adapted for discharge from said chamber at a third locus nearer to the chamber than the first and second locus. As shown in FIG. 1, the first locus is at the discharge end of one group of tubes and the second locus is at the discharge end of the other group of tubes. In this embodiment, the third locus is adjacent the chamber.

FIGS. 5 and 6 show another embodiment of the invention. Nozzle 50 is provided with chamber 56 and fluid inlet means 58 opening into the chamber. First and second outlet means, 51 and 49, respectively, and first and second duct means, 52 and 48, respectively, are similar to the outlet means and duct means shown in FIG. 1. Third outlet means 53 comprises a plurality of apertures arranged in two parallel rows and extending longitudinally along the chamber. The third outlet means is adapted with third duct means 54 for discharging fluid from said chamber between the first duct means and second duct means.

As shown, the circular apertures of the first, second and third outlet means are arranged in four parallel rows and each row extends longitudinally along the chamber. The first, second and third duct means each comprise a plurality of tubes which surround each of the circular orifices of the respective outlet means. It is important that duct means 52 and 48 extend a greater distance from the chamber than the third duct means so that the fluid discharged from the third duct means is discharged between the first duct means and the second duct means.

FIGS. 7, 8 and 9 illustrate another embodiment according to the principles of the invention. Nozzle 60 comprises a chamber having first, second and third sections, 67, 69, and 71 respectively. Each of the sections is not in open communication with any of the other sections. Each section has two fluid inlets for more uniform flow of the fluid. Fluid inlets 68, 70 and 72 open into sections 67, 69, and 71, respectively.

Section 67 has a first outlet means 66 in the form of a plurality of slots opening from the section for discharge of fluid into first duct means 65. Slots 66 are arranged in a row which extends longitudinally along section 67. First duct means 65 has a rectangular cross section, abuts section 67, is in open communication with the section and surrounds the row of slots 66. Section 71 has a second outlet means 63 in the form of a plurality of slots opening from the section for discharge of fluid into second duct means 62. Slots 63 are arranged in a row which extends longitudinally along section 71. Second duct means 62 has a rectangular cross-section, abuts section 71, is in open communication with the section and surrounds the row of slots 63. Third outlet means 64 is a plurality of slotted apertures arranged in a row extending longitudinally along section 69. The three rows of slots 66, 64, and 63 are in parallel relationship with row 64 being positioned between rows 66 and 63. Third outlet means 64 is adapted for discharging fluid between first duct means 65 and second duct means 62.

In this embodiment, the fluid, can be supplied in different amounts to inlets 68, 70 and 72; that is, a greater amount of fluid may be introduced into one section than another. For example, a larger amount of fluid can be introduced into section 69 for discharge through slots 64 than is introduced into sections 67 and 70 for discharge through slots 66 and 63, respectively.

Having described the invention in detail, it will be understood that the specific embodiments designated are for the sake of explanation only and that the invention is not limited thereto. Various modifications and substitutions can be made without departing from the scope of the invention as defined in the following claims.

I claim:

1. A nozzle in combination with a glass fiber forming bushing comprising:
   (a) a chamber having an inlet;
   (b) a first outlet means opening from said chamber for discharging fluid from said chamber;
   (c) a first duct means abutting said chamber in open communication with said chamber and surrounding said first outlet means;
   (d) a second outlet means opening from said chamber for discharging fluid from said chamber;
   (e) a second duct means abutting said chamber in open communication with said chamber and surrounding said second outlet means; and
   (f) a third outlet means opening from said chamber and adapted for discharging fluid from said chamber between said first duct means and said second duct means.

2. The nozzle of claim 1 wherein said first outlet means comprises a plurality of apertures.

3. The nozzle of claim 2 wherein said plurality of apertures is arranged in a row extending longitudinally along said chamber.

4. The nozzle of claim 3 wherein each of said apertures are circular.

5. The nozzle of claim 2 wherein said first duct means has a rectangular cross-section.

6. The nozzle of claim 2 wherein said first duct means comprises a plurality of tubes wherein each tube surrounds one of said apertures.

7. The nozzle of claim 1 wherein said second outlet means comprises a pluraity of apertures.

8. The nozzle of claim 7 wherein said plurality of apertures is arranged in a row extending longitudinally along said chamber.

9. The nozzle of claim 8 wherein each of said apertures are circular.

10. The nozzle of claim 7 wherein said second duct means is of rectangular cross-section.

11. The nozzle of claim 7 wherein said second duct means comprises a plurality of tubes, each tube surrounding one of said apertures.

12. The nozzle of claim 1 wherein said third outlet means comprises a plurality of apertures.

13. The nozzle of claim 12 wherein said plurality of apertures is arranged in a row extending longitudinally along said chamber.

14. The nozzle of claim 12 wherein said plurality of apertures is arranged in two parallel rows extending longitudinally along said chamber.

15. The nozzle of claim 1 wherein said chamber comprises a first section, a second section and a third section, said first outlet means opening from said first section, said second outlet means opening from said second section and said third outlet means opening from said third section.

16. A nozzle in combination with a glass fiber forming bushing comprising a chamber having an inlet, a first opening means adapted for discharge from said chamber at a first locus, a second opening means adapted for discharge from said chamber at a second locus, and a third opening means located between said first and second opening means and adapted for discharge from said chamber at a third locus nearer to said chamber than said first and second locus.

17. A nozzle in combination with a glass fiber forming bushing comprising:
(a) a chamber having an inlet;
(b) a first plurality of apertures opening from said chamber for discharging fluid from said chamber;
(c) a first plurality of tubes abutting said chamber in open communication with said chamber, each aperture of said first plurality of apertures being surrounded by a tube of said first plurality of tubes;
(d) a second plurality of apertures opening from said chamber for discharging fluid from said chamber;
(e) a second plurality of tubes abutting said chamber in open communication with said chamber, each aperture of said second plurality of apertures being surrounded by a tube of the second plurality of tubes; and
(f) a third plurality of apertures opening from said chamber adapted for discharging fluid from said chamber between said first plurality of tubes and said second plurality of tubes.

18. The nozzle of claim 17 wherein the first, second and third plurality of apertures extend longitudinally along said chamber.

19. The nozzle of claim 16 wherein the first, second and third opening means are each a plurality of apertures in parallel arrangement.

* * * * *